(12) United States Patent
Chen et al.

(10) Patent No.: US 8,694,644 B2
(45) Date of Patent: Apr. 8, 2014

(54) NETWORK-AWARE COORDINATION OF VIRTUAL MACHINE MIGRATIONS IN ENTERPRISE DATA CENTERS AND CLOUDS

(75) Inventors: Haifeng Chen, Old Bridge, NJ (US); Guofei Jiang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/485,924

(22) Filed: Jun. 1, 2012

(65) Prior Publication Data

US 2013/0086272 A1 Apr. 4, 2013

Related U.S. Application Data

(60) Provisional application No. 61/540,574, filed on Sep. 29, 2011.

(51) Int. Cl.
*G06F 15/16* (2006.01)

(52) U.S. Cl.
USPC ............................................. 709/226; 718/1

(58) Field of Classification Search
USPC ................. 709/200–203, 217–227; 718/1
See application file for complete search history.

(56) References Cited

U.S. PATENT DOCUMENTS

| 8,027,354 | B1 * | 9/2011 | Portolani et al. | 370/431 |
| 8,102,781 | B2 * | 1/2012 | Smith | 370/252 |
| 8,418,185 | B2 * | 4/2013 | Durham et al. | 718/104 |
| 8,473,557 | B2 * | 6/2013 | Ramakrishnan et al. | 709/206 |
| 2011/0138384 | A1 * | 6/2011 | Bozek et al. | 718/1 |
| 2011/0264788 | A1 * | 10/2011 | Costa | 709/224 |
| 2011/0296052 | A1 * | 12/2011 | Guo et al. | 709/240 |
| 2012/0011254 | A1 * | 1/2012 | Jamjoom et al. | 709/226 |
| 2012/0054367 | A1 * | 3/2012 | Ramakrishnan et al. | 709/242 |
| 2012/0096473 | A1 * | 4/2012 | Durham et al. | 718/105 |
| 2012/0137285 | A1 * | 5/2012 | Glikson et al. | 718/1 |
| 2012/0166644 | A1 * | 6/2012 | Liu et al. | 709/226 |
| 2012/0331468 | A1 * | 12/2012 | Bozek et al. | 718/1 |

OTHER PUBLICATIONS

Sherif Akoush, et al., Predicting the Performance of Virtual Machine Migration, Modeling, Analysis & Simulation of Computer and Telecommunication Systems (MASCOTS), 2010 IEEE International Symposium on, pp. 37-46, 2010.

Mohammad Al-Fares, et al., A Scalable, Commodity Data Center Network Architecture, Proceedings of the ACM SIGCOMM 2008 conference on Data communication, SIGGCOMM '08, vol. 38 Issue 4, pp. 63-74, 2008.

Christopher Clark, Keir Fraser, Steven Hand, Jacob Gorm Hansen, Live Migration of Virtual Machines, Proceedings of the 2nd conference on Symposium on Networked Systems Design & Implementation, NSDI'05, vol. 2, pp. 273-286, 2008.

Approximation Algorithms for Bin Packing: A Survey, E. G. Coffman, Jr., M. R. Garey, and D. S. Johnson, Approximation Algorithms for NP-Hard Problems, D. Hochbaum (editor), PWS Publishing, Boston (1997), 46-93.

(Continued)

*Primary Examiner* — Moustafa M Meky
(74) *Attorney, Agent, or Firm* — Bao Tran; Joseph Kolodka

(57) ABSTRACT

Systems and methods are disclosed to schedule virtual machine (VM) migrations by analyzing VM migration behavior; building a simulation tool to predict time for multiple migrations under different links conditions and VM characteristics; determining a predetermined bandwidth sharing policy for each network link; applying a bin-packing technique to organize bandwidth resources from all network links, and allocating the links to different migration tasks.

20 Claims, 5 Drawing Sheets

(56) References Cited

OTHER PUBLICATIONS

Liang Guo, et al., The War Between Mice and Elephants, Proceedings of the Ninth International Conference on Network Protocols, ICNP '01, p. 180, 2001.

Yoo-Ah Kim, Data Migration to Minimize the Average Completion Time, Proceedings of the fourteenth annual ACM-SIAM symposium on Discrete algorithms, SODA '03, pp. 97-98, 2003.

Chenyang Lu, et al., Aqueduct online data migration with performance guarantees, Proceedings of the 1st USENIX Conference on File and Storage Technologies, FAST '02, Article No. 21, 2002.

Yangyang Wu, Performance Modeling of Virtual Machine Live Migration, Proceedings of the 20th international symposium on High performance distributed computing, HPDC '11, pp. 171-182, 2011.

* cited by examiner

NETWORK-AWARE COORDINATION OF VIRTUAL MACHINE MIGRATIONS IN ENTERPRISE DATA CENTERS AND CLOUDS

This application claims priority to Provisional Application Ser. No. 61/540,574 filed Sep. 29, 2011, the content of which is incorporated by reference.

BACKGROUND

The present invention relates to virtual machine migrations.

Virtual machine (VM) migration is nowadays being increasingly utilized in data centers and clouds to facilitate the management of computing systems. However, the migration usually requires a considerable amount of system resources such as the network bandwidth. In the case of multiple simultaneous migrations, which also happens regularly in data center operations, such resource demands will increase dramatically and are difficult to be satisfied immediately. As a results, the performance of the system will be significantly impacted. In the worst case, the system may crash due to the shortage of resources.

Live VM migration is being widely utilized in virtualized data centers and clouds due to its capability of maintaining high system performance under dynamic workloads. However, VM migration requires considerable network bandwidth and other resources, which may in consequence lead to performance degradations of the migrating VM during the period of migration. While that resource demand and VM performance drop are usually affordable for a single VM migration due to the short period of that process, it is challenging to manage multiple concurrent migrations because the system may not have enough resources immediately to meet the dramatic resource demands from many VMs. As a result, it will take much longer time for multiple migrations to complete, which leads to long performance degradations for those VMs. To this end, this paper investigates the behavior of concurrent VM migrations, and proposes a solution to schedule multiple migrations appropriately for the avoidance of adverse impacts caused by resource shortages.

In general, multiple VM migrations show up regularly in real system operations. For instance, if some physical machines need to be removed from service for maintenance, all the VMs in those machines have to be migrated to other places. Since applications are nowadays comprised of many VMs distributed across several machines for the purpose of load balancing and fault tolerance, the workload surge in an application may require the rearrangement of several VM instances in the system. An even worse situation is that some system faults such as configuration mistakes may trigger a large number of VM migrations. In those cases, it is important to handle concurrent VM migrations in an effective way, so that they can be completed as fast as possible and hence the total performance degradation time for those VMs can be minimized.

While data migrations are conducted between storage devices in which the storage 10 usually becomes the resource bottleneck, VM migration mainly moves VM memory pages between machines where the network bandwidth becomes precious for most cases. More importantly, unlike the data migration where the size of transferred data are usually fixed, the contents that need to be transferred in VM migration vary with the available network bandwidth as well as the characteristics of VM such as its memory dirty rate. This is due to the mechanism of iterative memory pre-copy implemented in most migration software, where the number of memory pages need to be transferred in each pre-copy round depends on the speed of transfer in previous rounds. For the same migration task, it may take much longer time than expected in a small bandwidth network compared with that with enough bandwidth, especially when the memory dirty rate of that VM is high.

The unique features of VM migration pose new challenges when multiple VMs request to migrate simultaneously. First, since those migrations may have overlapped links in their migration paths, the system needs to determine whether to let them share the link by initiating them concurrently, and what is the maximum number of concurrent migrations allowed in that link. The link sharing between multiple migrations can improve the overall utilization of network bandwidth due to the resource multiplexing between migration flows, and thus contribute to the quick completion of migrations. However, the amount of transferred memory pages also increases since each VM is only allocated with a portion of bandwidth in the overlapped links. A balance is needed in determining the optimal number of concurrent migrations that share the network link.

Conventional human made policies specify a max number of VM migration allowed in the network, but under real situations, network bandwidth usages and VM memory usages are always changing and such fixed policy may not satisfy all the real condition. Making such a balance is difficult because it depends on numerous factors including as the link capacity and the VM memory dirty rate. In addition, the dependency of migration performance with respect to those factors is non-linear, which is hard to be predicted by mathematical formulas.

SUMMARY

Systems and methods are disclosed to schedule virtual machine (VM) migrations by analyzing VM migration behavior; building a simulation tool to predict time for multiple migrations under different links conditions and VM characteristics; determining a predetermined bandwidth sharing policy for each network link; applying a bin-packing technique to organize bandwidth resources from all network links, and allocating the links to different migration tasks.

In one embodiment, the system analyzes the VM migration behavior and builds a simulation tool to predict the time of multiple migrations under different links conditions and VM characteristics. By analyzing the simulation outputs, the system can discover the best bandwidth sharing policy for each network link, i.e., the number of concurrent migrations that can lead to the shortest completion time. Based on the link sharing policy, the system uses a bin-packing algorithm to organize bandwidth resources from all the network links, and allocate them to different migration tasks. As a result of the global resource assignment, the migration tasks can fully utilize available resources in the whole network to achieve fast completion.

Implementations of the above aspects may include one or more of the following. The system processes a single link VM migration sharing policy. The system can analyze VM migration behavior. The system can simulate the performance of a single VM migration. Next, the system includes simulating the performance of a plurality of VM migrations, which can include performing network resource multiplexing and/or determining overhead associated with communication protocols. The system can also determine global resource assignments. This includes determining a network link capacity.

The system can pack multiple migrations into one. This in turn can include migration demand estimation and/or packing each item.

Advantages of the system may include one or more of the following. The system improves existing computing system so that they can still keep good performance under unexpected resource shortage situations cause by multiple VM migrations. The system also significantly improves the reliability of the computers running VMs. Unlike existing solutions, the system provides an adaptive solution to schedule VM migrations, which can keep high system performance for various situations. The scheduling method for multiple VM migrations guarantees fast completion of VM migration tasks and hence the reduced impacts on system performance.

DESCRIPTION

Figure 1:
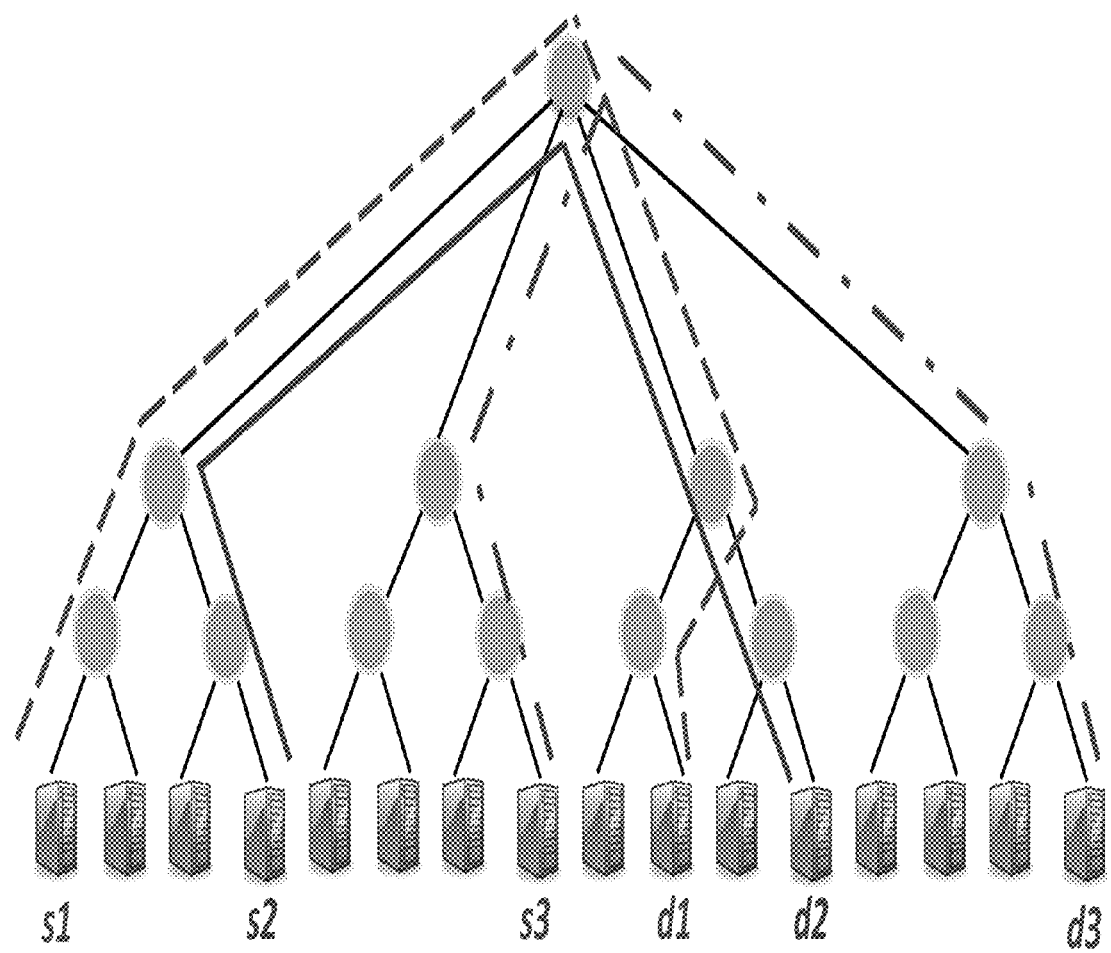
FIG. 1 shows an exemplary network structure.

FIG. 1 shows an exemplary network structure with nodes s1, s2, s3, d1, d2, and d3, for example. Given the system network structure, the system measures the available bandwidth in each network link. The system also collects the virtual machine characteristics, such as its memory usage patterns, for all VMs in the system.

Turning now to FIG. 1, an example illustrating the problem of global resource assignment is shown. In a typical three-tier data center network, there are three migrations $M_1$, $M_2$ and $M_3$, from source $s_i$ to the destination machine $d_i$, i=1, 2, 3, whose migration paths are plotted as the dash, solid, and dash-dot lines respectively. As we can see, since the migration $M_3$ has a totally disjoint path with $M_1$ and $M_2$, $M_3$ can be scheduled concurrently with $M_1$ and $M_2$. On the other hand, since $M_1$ and $M_2$ have overlapped links in their migration paths, whether we can schedule them concurrently depends on the bandwidth sharing policy in those common links. That is, if the available bandwidths in overlapped links are large enough to support parallel migrations for the quick completion of both tasks, we can execute $M_1$ and $M_2$ concurrently, and vice versa.

Figure 2:
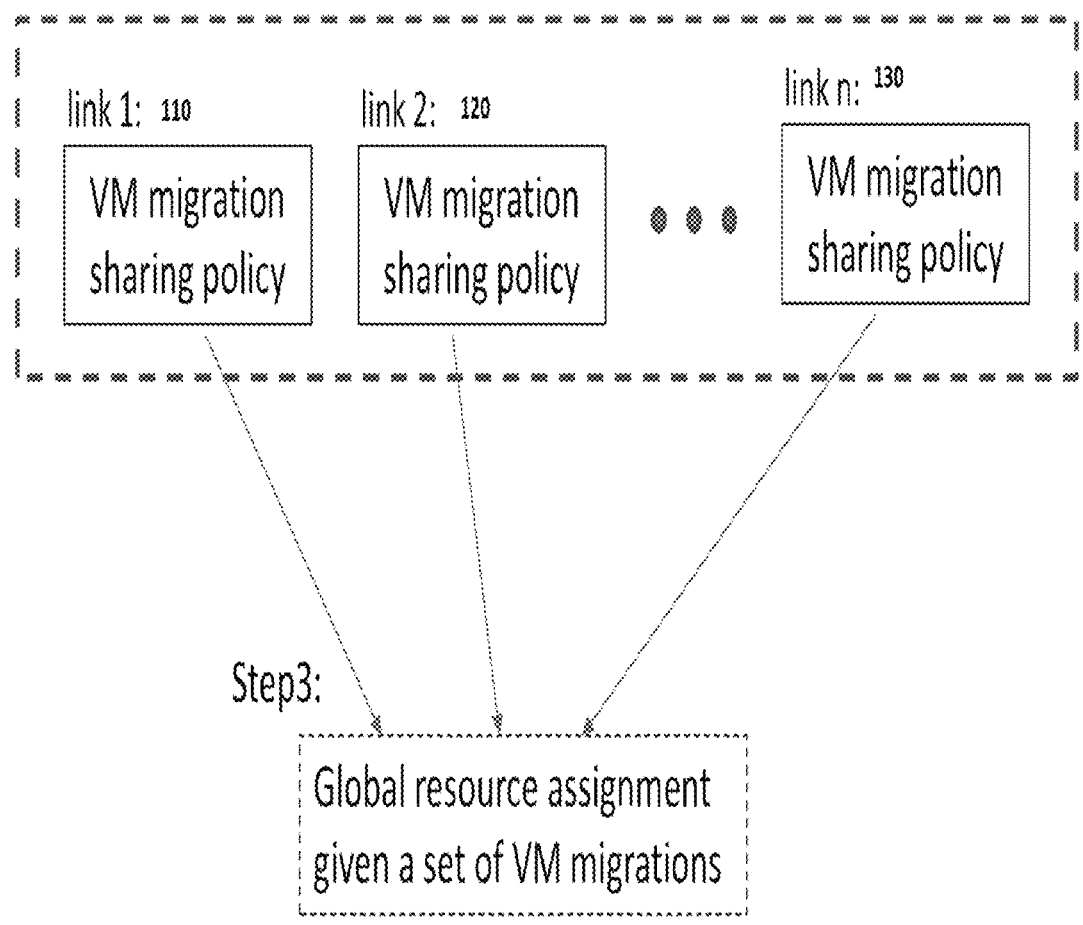
FIG. 2 shows an exemplary simulation of VM migration sharing policy for network links.

Next, the system generates a simulation tool to analyze the VM migration sharing policy in each network links, i.e., how many VM migrations with certain characteristics can be allowed in each link. This is shown in FIG. 2 with links 110, 120 and 130.

Figure 3:
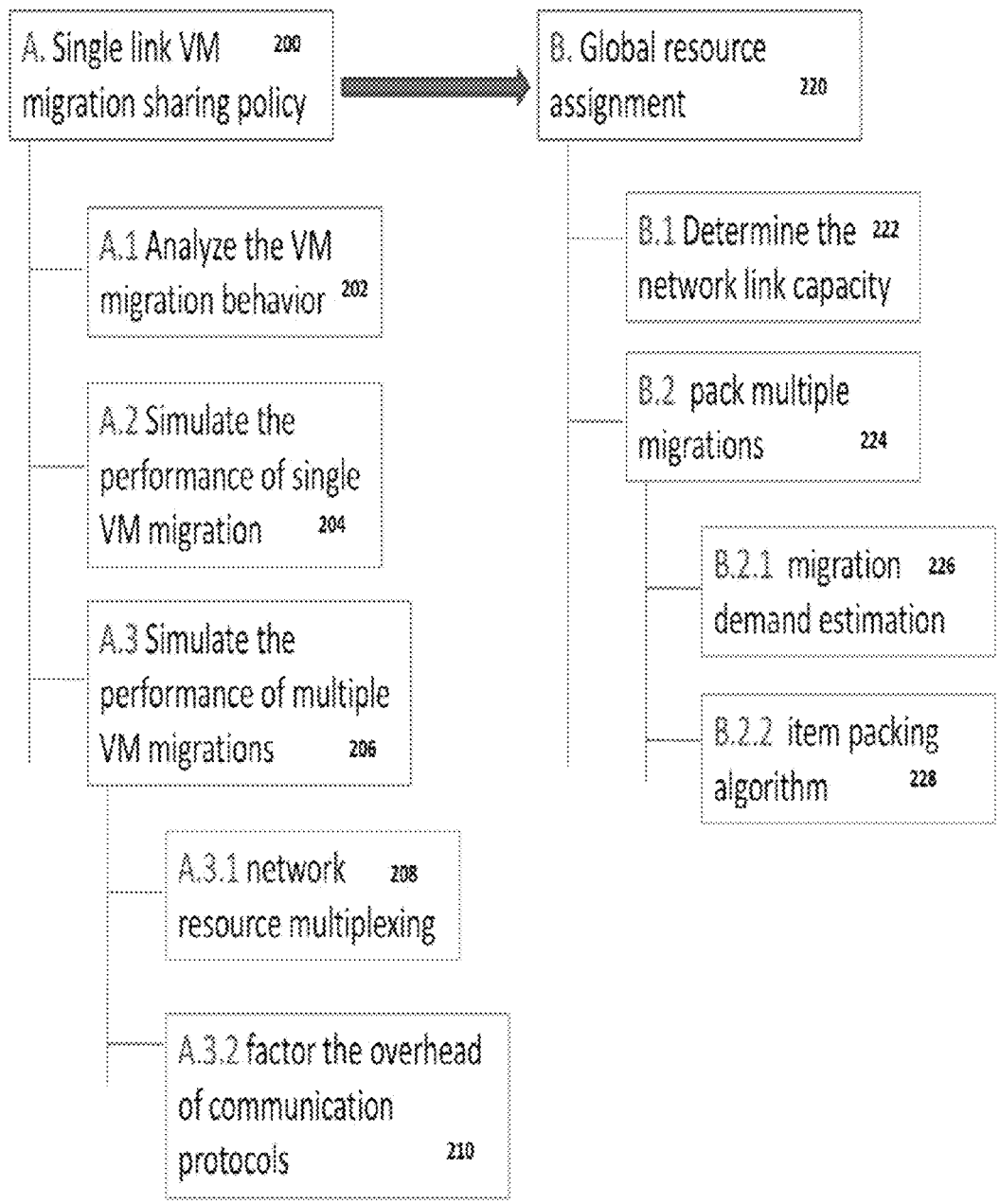
FIG. 3 shows an exemplary global resource assignment process given a set of VM migrations.

Considering the VM migration sharing policy in each network link, as well as the paths of each migration tasks, the system generates a global resource assignment solution to best utilize all the network resources 140, as shown in FIG. 3.

Software simulation is used to identify the optimum link sharing policy under different VM and link conditions. The simulation follows the source code implementation in Xen to predict the VM migration time given the available link bandwidth and VM characteristics. In the case of multiple VM migrations, the system incorporates several extra factors in the simulation. For example, some migration overheads, such as the time spent in the initial resource reservation and final VM activation in the target machine, can be saved by the parallelism of multiple migrations. The system can model behavior of bandwidth usages when multiple migrations share the network link. By running the simulation tool, the system can compare VM migration performance under different conditions, and then generate the optimal sharing policy for each link, i.e., the number of concurrent VM migrations that can achieve the minimal total migration time, based on the link's available bandwidth and VM's memory page dirty rate.

Figure 4:
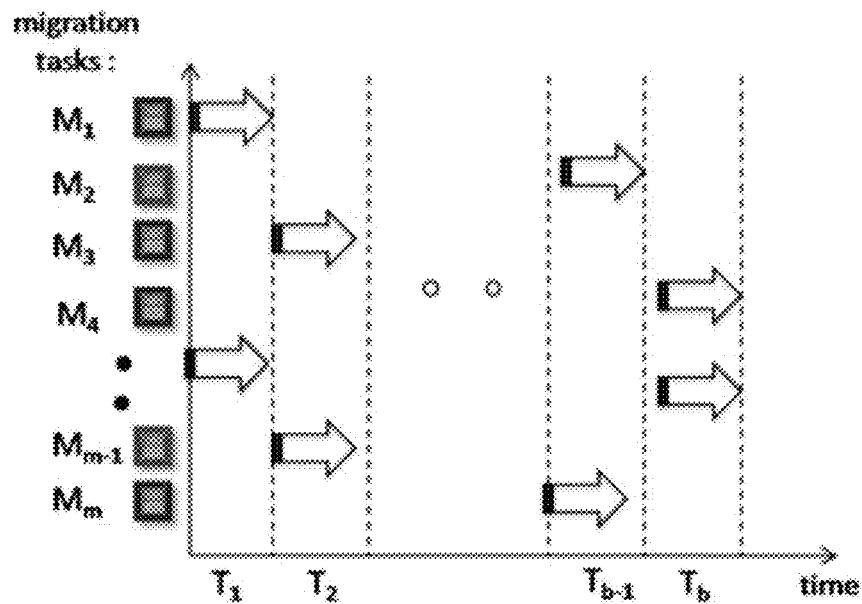
FIG. 4 shows an exemplary migration scheduling performed as a bin-packing process.

Turning now to FIG. 4, a process to migrate multiple VMs is shown. First, the system processes a single link VM migration sharing policy (200). The system can analyze VM migration behavior (202). The system can simulate the performance of a single VM migration (204). Next, the system includes simulating the performance of a plurality of VM migrations (206), which can include performing network resource multiplexing (208) and/or determining overhead associated with communication protocols (210).

In addition to the network link sharing, another challenge for multiple VM migrations is the assignment of system global resources to each migration to achieve the quick completion of those tasks. This is because that the network is comprised of a lot of links with various available bandwidth and multiple migrations travel through different sets of network links. While the link sharing strategy only concerns with the number of migrations in each individual link, the global resource assignment attempts to find the optimal scheduling of VM migrations to fully utilize the bandwidth in the whole network. For example, if a VM's migration path does not overlap with those of other tasks, the system can initiate it immediately. But if some links along a VM's migration path are shared with other migrations, a plan is needed to order those tasks based on the migration sharing policies in those links. The system can also determine global resource assignments (220). This includes determining a network link capacity (222). The system can pack multiple migrations into one (224). This in turn can include migration demand estimation (226) and/or packing each item (228).

One embodiment uses a bin-packing algorithm to address the global resource assignment, in which the bin represents all the links in the network and the item denotes each migration task. While the capacity of the bin is determined by the available bandwidth in all network links, the size of each item is associated with the bandwidth demand of each migration, which can be estimated from the migration sharing policy in each link along that VM's migration path. Given the bin capacity and item sizes, the system uses the first-fit decreasing (FFD) heuristic to allocate each migration to a corresponding bin so that the total number of bins to host those migrations is minimized. As a result, the system achieves the quickest completion of migration tasks, because the number of bins corresponds to the length of period for executing those migrations.

A testbed is used to run VM migrations given different VM characteristics and link bandwidth. Real evaluation results are compared with simulation outputs, and the simulation tool can provide accurate predictions for migration performance under different conditions. The migration scheduling technique is further tested by simulating different numbers of VM migrations in a large data center. Results show the migration scheduler can achieve a fast completion of multiple migrations.

One embodiment focuses on the pre-copy migration technique, which is the default VM migration mechanism for most virtualization software such as Xen, VMware, and KVM. Although the actual implementations of pre-copy based VM migration vary with different vendors, their underlying mechanisms are the same. Therefore, while Xen is used with the migration scheduling approach, the method can be applicable to other virtualization tools.

The pre-copy migration makes use of an iterative multipass algorithm to transfer VM guest memory in successive steps. In each iteration, only the memory that has been dirtied in the interim is sent. When the pre-copy stage is terminated, the final state is sent to the new host and the transfer of control to the new physical machine is completed. FIG. 4 presents the main stages of VM migration from host A to destination B. Note the iterative pre-copy may continue indefinitely until some stop conditions are satisfied. In Xen, it will stop as long as one of the following conditions is true:

Less than 50 memory pages were dirtied during the last pre-copy iteration;

29 pre-copy iterations have been executed;

The size of copied memory has reached 3 times the total amount of RAM allocated to the VM.

Among the above conditions, the first one represents the convergence of pre-copy so that only a few pages need to be transferred in the last round, whereas the other two conditions just force the termination of pre-copy stage when non-convergent behaviors are observed.

The migration of a VM from the source machine A to the destination host B includes following steps:

1. Resource Reservation: resources at the destination host B are reserved.

2. Iterative pre-copy: VM memory pages modified during the previous iteration are transferred to the destination. The entire RAM is sent in the first iteration.

3. Stop-and-copy: The VM is halted for the final transfer round. The remaining memory pages are transferred to the destination B.

4. Commitment and Activation: After machine B indicates that it has successfully received a consistent copy of the VM, resources are re-attached to the VM in host B.

Two metrics are commonly used to quantify the VM migration performance: the total migration time and the service downtime. While the total migration time covers the duration of entire migration process, the service downtime happens between when the VM is suspended at machine A and when it is activated in machine B, i.e., the last stage of migration. The system mainly focuses on the total migration time because it is the period in which the migrating VM demonstrates performance degradations. Other VMs located in the source and destination machines are also impacted due to their competitions with the migration process for system resources. The system does not investigate the interferences between the migrating VM and background applications. Given current available resources in the system, the goal is to properly schedule migration tasks to reduce their total migration time. As a result, the period for performance drop in migrating VMs (and possible background VMs) can be reduced.

In reality, when multiple migrations occur concurrently, their overall migration time may become much longer due to the pre-copy mechanism. In order to demonstrate this, the system first models the migration time of a single VM given its memory size V and memory dirty rate R in a network link with available bandwidth B. Among the four stages described in FIG. 4, the time spent in the 'resource reservation' and 'commitment and activation' is relatively stable, which can be described by two constant values Pre-migrationOverhead and Post-migrationOverhead. However, the time for the pre-copy and stop-and-copy varies significantly with the link condition and VM characteristics. It starts with the transfer of all VM memory pages which takes time $t_0=V/B$, followed by transferring memory pages that are dirtied in the previous round, which takes $t_1=R*t_0/B, t_2=R*t_1/B, \ldots, t_{k-1}=R*t_{k-2}/B, \ldots$. The pre-copy process is stopped at the Kth round when stop conditions are met. After that, the source VM is suspended and the remaining memory is transferred to the destination which takes $t_K=R*t_{K-1}/B$. So the period for the pre-copy and stop-and-copy is computed as $$T_0 = t_0 + t_1 + \ldots + t_K \qquad (1)$$
$$= \frac{V}{B} \times \frac{1-(R/B)^{K+1}}{1-R/B}$$

As a whole, the total migration time is described as $$T_{mig} = PremigrationOverhead + T_0 + PostmigrationOverhead \qquad (2)$$

VM migration is different from pure data migration. While in data migration the size of transferred data is fixed under different network conditions if the system ignores the resent data for packet losses, the size of transferred content in VM migration varies with the link bandwidth as well as the VM memory dirty rate, as shown in equation (1). Given larger network bandwidth, the time $t_i$ for each pre-copy iteration will be shorter, which in consequence generates less contents $R*t_i$ for the next round and hence leads to the earlier convergence of pre-copy. On the other hand, a network with low bandwidth will generate more memory pages that need to be transferred in pre-copy iterations.

Due to the unique behavior of VM migration, the system needs to properly handle the situation where multiple VMs request for migration simultaneously. First, if migration tasks traverse through some common links in the network, the system need to determine whether to execute those tasks in one batch to share the overlapped links or in several batches sequentially. Making such a decision requires the prediction of VM migration performance under those different conditions. However, as shown in equation (1), the migration performance depends on several factors including the link bandwidth and VM characteristics, and such dependencies are nonlinear. Software simulation is used to discover the migration performance under different link sharing strategies. Based on the simulation results, the system can identify the optimal sharing policy among migrations in the overlapped network links.

While the optimal link sharing is associated with each individual network link, it is also necessary to organize the global resources from all network links and assign them to multiple migration tasks, because each migration usually travels through many network links. The system finds a schedule to determine which VM needs to migrate first and together with which other VMs, so that the bandwidth in the whole network can be fully utilized and hence the total migration time of those tasks can be minimized. One embodiment transforms the migration scheduling into a bin-packing problem, in which the bin represents the whole network links and the item denotes each migration task. The system presents an algorithm to pack migration tasks into the smallest number of bins, which leads to the quickest completion of those tasks.

Given s migration tasks, if executed in parallel, the total migration time $T^{(pal)}$ becomes $$T^{(pal)} = \max \{T_{mig-1}, T_{mig-2}, \ldots, T_{mig-s}\} \qquad (3)$$

where $T_{mig-i}$ is the duration of the ith migration. Note that the value of $T_{mig-i}$ varies with number of concurrent migrations s due to the differences in allocated bandwidth. Here we estimate $T_{mig-i}$ under various setting of s, and identify the best network link sharing strategy, i.e., the s concurrent migrations that lead to the shortest total migration time. The system uses the normalized value $T^{(pal)}/s$ to compare the overall migration time under different s values.

When s=1, it corresponds to the case when migrations are performed sequentially. With the increase of s value, more migrations are executed in parallel. Compared with the sequential migration, there are both advantages and disadvantages if multiple migrations are issued simultaneously. First, the system can reduce the total amount of pre-migration and post-migration overhead in parallel migrations. This is because the time spent in the 'resource reservation' and 'commitment and activation' stages in VM migration are less dependent on the allocated network bandwidth. By executing those two stages in parallel for all migrations, the system can save the total migration time.

Scheduling several migrations simultaneously can also improve the bandwidth utilization of network links. Since VM memory pages are transmitted over the TCP socket in the migration, the additive increase and multiplicative decease mechanism in TCP congestion control may underutilize the network bandwidth. While tuning some TCP configurations, such as allocating large TCP buffers, may improve the bandwidth utilization, a dedicated TCP flow still could not make use of all the available bandwidth due to its implementation overhead. By assigning multiple migration flows in a single link, the system can multiplex the usage of network bandwidth to improve the migration efficiency. The assumption is that the background network traffic initiated by non-migrating VMs have much shorter durations than the migration flows, which is typical in enterprise network operations. As a consequence, those background traffic flows may not significantly interfere with the long migration flows.

On the other hand, due to the sharing of network link in parallel migrations, the allocated network bandwidth for each migration is reduced compared with the sequential case. Such a bandwidth reduction will generate more memory pages that need to be transferred during the migration, which in consequence leads to an increase of VM migration time.

TABLE 1

Total time of two VM migrations when they are executed sequentially and in parallel.

|  | VM page dirty rate | link bandwidth | sequential migration | parallel migration |
|---|---|---|---|---|
|  | 2 k/s | 1 Gbps | 22 s | 20 s |
| Case 1 | 15 k/s | 1 Gbps | 27 s | 38 s |
|  | 10 k/s | 1 Gbps | 23 s | 21 s |
| Case 2 | 10 k/s | 300 Mbps | 78 s | 90 s |

In order to find a balance between the benefits and disadvantages of network link sharing, the system needs to first predict the VM migration performance under different link sharing strategies. However, due to the complexity of VM migration, its duration depends on several factors such as the available bandwidth in the link and VM memory dirty rates. Table 1 presents two examples to illustrate this, in which the system compares the time of two migrations when they are executed in a sequential order and simultaneously. In the first example, the system migrates the VMs with 1 GB memory in a link with 1 Gbps bandwidth. It shows that when the VMs have 2 k memory dirty pages per second, it takes only 20 seconds for parallel migration to complete, whereas sequential migration consumes 22 seconds. However, when the VM memory dirty rate increases to 15 k pages per second, parallel migration becomes slower than the sequential one. In the second example, the system compares the migration time of two VMs with 1 GB memory and 10 k memory pages per second dirty rate in different link situations. It shows that while parallel migration is faster than the sequential case when two migrations are executed in a link with 1 Gbps available bandwidth, sequential migration becomes much faster when the link bandwidth drops to 300 Mbps.

The above observations illustrate the complex behavior of VM migration whose performance is hard to be predicted accurately. Even in a single VM situation, the migration time is a nonlinear function of link condition and VM characteristics, as shown in equation (1). When several extra factors are involved in multiple simultaneous migrations, it becomes even harder to develop a mathematical model to predict the VM migration performance. As an alternative, software simulation can be used to identify the migration performance under different link sharing strategies. Our simulation follows the source code of VM migration implemented in Xen, which is in accordance with the stages described in FIG. 4. The focus is to predict the migration time $T_{mig-i}$ of each VM under s simultaneous migrations, and hence their overall migration time $T^{(pal)}$.

The VM migration time $T_{mig-i}$ is composed of three parts: the PremigrationOverhead, the time $T_0$ spent in the 'iterative pre-copy' and 'stop-and-copy' stages, and the PostmigrationOverhead. In multiple simultaneous migrations, the system uses the same value of PremigrationOverhead and PostmigrationOverhead as in the single VM migration, because those parameters usually do not change too much with respect to the allocated resources. However, the time $T_0$ will change significantly due to the bandwidth sharing between multiple migrations. In the case when s migrations are executed simultaneously in a network link with available bandwidth B, each migration is allocated with only B/s bandwidth. Considering the overhead of TCP protocol in bandwidth utilizations, the system further expresses the allocated bandwidth for each migration as $$\tilde{B} = B*(1-\Delta)/s \qquad (4)$$

where $\Delta$ represents the degree of bandwidth reduction due to the overhead of TCP congestion control. The value of $\Delta$ decreases with the increase of s, i.e., the number of concurrent migrations, due to the multiplexing of bandwidth usages between multiple migrations. The system uses the following equation to determine the $\Delta$ value $$\Delta = 0.25 * \exp\{-0.5*(s-1)\}. \qquad (5)$$

The system uses an exponential function in (5) to describe $\Delta$ because the system finds that it best fits the results of our experiments. There are two constant parameters in (5), 0.25 and 0.5. The first one 0.25 is determined by the TCP behavior of 'additive increase and multiplicative decrease', because when only one migration occurs in the network, i.e., s=1, the bandwidth utilization is 0.75 of the full bandwidth (and 0.25=1−0.75). The second constant value 0.5 comes from the calibration of function (5) based on the experimental results. From equations (4) and (5), while $\tilde{B}$ is only around 0.75B when one migration is executed in the link, the real utilized bandwidth for each migration exponentially increases to approach B/s as the number of concurrent migrations s increases. Given the real bandwidth $\tilde{B}$, the system can simulate the time $T_0$ for each migration, and hence its total migration time $T_{mig-i}$.

By using the simulation tool, the system evaluates the total VM migration time under various link sharing strategies, given different VM characteristics and link available bandwidth. From the simulation results, the system finds that the optimal link sharing mainly depends on two factors: the link available bandwidth, and the memory dirty rates of migrating VMs. This is because that those two metrics determine the size of extra contents, in addition to the original VM memory, that need to be transferred during the migration. After summarizing many simulation scenarios, the system can obtain the optimal s number of concurrent migrations, given specific link bandwidth and VM memory dirty rates, that can lead to the shortest total migration time.

The system assumes that all the migrating VMs have 1 GB memory and share the same memory dirty rate. The optimal migration number s increases with the increase link bandwidth, but decreases with the increase of VM memory dirty rates. For the region with large link bandwidth and small memory dirty rates, the system can run 3 concurrent migrations to achieve the best performance. This is because that the benefits of link bandwidth sharing surpass the disadvantage of increased memory dirty pages in those bandwidth sufficient and low memory dirty rate conditions. On the other hand, when the link bandwidth is small and VMs have large memory dirty rates, sequential migration performs the best. It is hard to estimate the s value based on just one of those two metrics. Only when the system have the values of both link bandwidth and VM memory dirty rates, the system can determine the optimal concurrent migration number.

Next, the global resource assignment is discussed. In the above discussion, the bandwidth is shared in a single network link for multiple migrations. However, the whole network is comprised of a large number of communication links organized by certain topology design. Meanwhile, each migration usually covers a set of network links in its migration path, i.e., from the source to destination machines. Based on the bandwidth sharing policy in each link, this section attempts to find an optimal assignment of global network resources for multiple migrations to achieve the minimal total migration time. FIG. 1 shows such multiple migrations in the network. While it is relatively easy to handle only two migrations with overlapped links as in the above example, it becomes a combinatorial optimization problem to find the best organization of many migrations with different overlapped links along their migration paths. In one embodiment, the system uses a bin-packing algorithm to address that issue. The system treats all the links in the network as a bin, and use a multi-dimensional vector C to represent its capacity. That is, the system can index each link in the network, and measure the available bandwidth in those links as $$C=[c_1,c_2,\ldots,c_r]^T \quad (6)$$

where r equals to the number of links in the bin. In practice, the value of r depends on the number of physical links in the network as well as the network configurations. For example, when the network is operated in the full-duplex mode, which is typical in network configurations, the value r equals to twice the size of network links due to the differentiation in traffic directions. If the network is configured by equal-cost multipath (ECMP) load sharing, the system needs to combine those multiple links that are used for balancing the load into a logic link, and only include the logical link in the vector (6).

The item in the bin-packing algorithm relates to each migration task. Given the indices of network links, the system uses a r dimensional binary vector $P^{(i)}=[1, 0, 0, \ldots, 1]^T$ to represent the path of migration $M_i$, in which the value '1' in the ith entry indicates the inclusion of the ith link in the path and '0' vice versa. The end-to-end bandwidth demand for migration $M_i$ is defined as a vector $$D^{(i)}=P^{(i)} \times d^{(i)}=[1,0,0,\ldots,1]^T \times d^{(i)} \quad (7)$$

$d^{(i)}$ is the expected bandwidth allocated to $M_i$, which will be determined in Eq. 9.

Now given the capacity of the bin and the resource demands of all items, the bin-packing algorithm is to pack those items into the smallest number of bins. By doing so, the system can achieve the quickest completion of all migrations, because the number of bins generated by bin-packing represents the total duration of those migrations.

There are several questions need to be addressed following the bin-packing framework. 1) How to determine the expected bandwidth allocation $d^{(i)}$ in equation (7), and hence the demand $D^{(i)}$, for each migration task? 2) What is the detail of bin-packing algorithm used for migration scheduling? 3) if the same duration is used for all migrations, how to deal with the situation where migration tasks have different durations? The system addresses these issues by estimating the migration demand.

The expected bandwidth $d^{(i)}$ allocated to each migration $M_i$ is important for achieving the shortest completion of multiple migrations. If $d^{(i)}$ is small, the system can pack more migrations in each bin, and the total migration period can be reduced. However, if $d^{(i)}$ is too small, there will be many concurrent migrations in each bin to compete for network resources, and hence the migration time for those concurrent tasks, i.e., the length of each epoch, will become longer. Since the optimal link sharing policy provides a guideline about the number of concurrent migrations in each network link, the system determines the value of $d^{(i)}$ based on such policies in all the links along $M_i$'s migration path.

The system denotes the links in $M_i$'s path as a set $\{l_1^{(i)}, l_2^{(i)}, \ldots, l_k^{(i)}\}$, each of which has available bandwidth $c_j$, $j=1, \ldots, k$. In the following the system first estimates $M_i$'s bandwidth demand in each link $l_j^{(i)}$, and then derive the overall demand $d^{(i)}$ from those local estimations.

Given the available capacity $c_j$ of link $l_j^{(i)}$ and and a migrating VM with memory page dirty rate $R_i$, the system can identify its optimal bandwidth sharing policy $s_j^{(i)}$ in that link from the simulation results, which represents the optimal number of such VMs that can migrate simultaneously in the link to achieve the minimal total migration time. Based on that, the system determines the bandwidth demand of $M_i$ in link $l_j^{(i)}$ as $$d_j^{(i)}=c_j/s_j^{(i)} \quad (8)$$

That is, the local bandwidth demand $d_j^{(i)}$ of $M_i$ is determined to allow $s_j^{(i)}$ such concurrent migrations in the link to achieve the optimal migration time. If the link available capacity is not big enough to support parallel migrations, i.e., $s_j^{(i)}=1$, the migration $M_i$ can consume all the available bandwidth in that link. Otherwise, $M_i$ only obtains a portion of the bandwidth capacity because it has to share the link with other migration tasks. Note that equation (8) provides an approximated value for $d_j^{(i)}$ because it assumes that all migrating VMs have the same characteristics such as the memory page dirty rate. While the system can further differentiate the characteristics of migrating VMs to achieve more accurate $d_j^{(i)}$ value, it will significantly increase the problem complexity and hence the combinatorial search space for bin-packing algorithm. Therefore, the system uses equation (8) to estimate the local migration demand, which is easy to implement but still keeps good accuracies.

Once the system finds the bandwidth demand $d_j^{(i)}$ for all the links $l_j^{(i)}$, $j=1, \ldots, k$ along $M_i$'s path, the overall bandwidth demand of $M_i$ is determined as the maximum demand among all the local estimations $$d^{(i)} = \max\{d_1^{(i)}, d_2^{(i)}, \ldots, d_k^{(i)}\} \quad (9)$$

The intuition here is that the overall demand $d^{(i)}$ should satisfy all the local demands $d_j^{(i)}$ to ensure the quick completion of migrations. Note that although rare, it is possible that the demand $d^{(i)}$ may exceed the available bandwidth of some links in $M_i$'s path. In that case, $d^{(i)}$ is determined as the minimal bandwidth capacity of those links. Next, the system determines a Bin-Packing Solution.

The system wants to pack the migration tasks into the smallest number of time slots, where the aggregated demand of assigned migrations in each time slot should not exceed the capacity of the network. Such a bin-packing problem is NP-hard, and there have been a number of heuristics to identify its near optimal solution. In this paper the system uses the first-fit decreasing (FFD) heuristic to schedule the migrations. The FFD method sorts migration tasks in a decreasing order of bandwidth demands, and attempts to place each task in the earliest epoch that can accommodate it. More concretely, the FFD based migration scheduling can be described in the following steps.

1. Transform the resource demand vector $D^{(i)}$ for each migration $M_i$, described in equation (7), into a scalar $\eta^{(i)}$, $D^{(i)} \to \eta^{(i)}$, where $\eta^{(i)}$ equals to the summation of all the elements in $D^{(i)}$;
2. Sort the resource demands based on their transformed $\eta^{(i)}$ values;
3. Scan migration tasks from high to low $\eta^{(i)}$s. For each selected migration task, the system tries to place it in the earliest time interval T that still has free capacities to host it;
4. Repeat Step 3) until all the migration jobs have been allocated.

In Step 1 the system transforms the demand vector D into a scalar $\eta$ because it is not straight forward to use the vector D to compare and sort bandwidth demands between different migrations. Here the system uses the summation of all the elements in D as the transformed scalar $\eta$. The intuition is that the migrations that require more bandwidth and also cover more links should get higher priorities in the scheduling. After performing all the above steps, the number of assigned bins $T_b$ equals to the duration of total migration tasks.

In practice, the migration tasks have different time durations due to their variances in VM memory size, memory page dirty rate, and so on. There are no clear boundaries between each time slot to synchronize migration tasks. In those general situations, the system still uses the FFD based heuristics to schedule migrations. However, the start of each migration is triggered by event signals rather than the time. That is, when a migration is completed, it sends a signal to the migration scheduler. Upon receiving that event, the scheduler computes the current available bandwidth in the network links $$C^{(new)} = C - \sum_{\text{active migrations } M_k} D^{(k)} \quad (10)$$

where C is the original link capacity described in equation (6) and $D^{(k)}$s are the bandwidth demands of ongoing migrations.

The system regards $C^{(new)}$ as the current bin size, and scan the ordered migration tasks in the waiting list with an attempt to allocate as many of them as possible to fill the capacity $C^{(new)}$. The whole process stops when all the VMs have migrated to their target machines.

Figure 5:
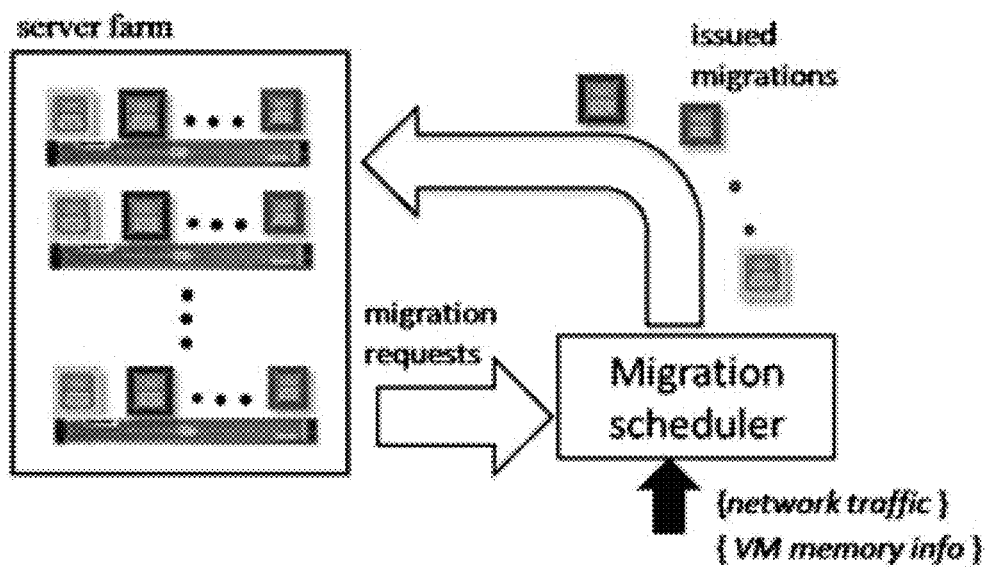
FIG. 5 shows an exemplary migration scheduler.

FIG. 5 illustrates the overall function of our migration scheduler. The system instruments the virtualization management domain, i.e., domain 0 in Xen, in each machine to send a request to the scheduler whenever any of its hosted VMs wants to migrate. Upon receiving the requests, the scheduler decides when to make that action based on the requests from other virtual machines. If there are no concurrent requests for migrations, the migration can start immediately. Otherwise, the scheduler makes a migration plan based on the bin-packing algorithm described above. That is, it first schedules a number of migrations to fill the available capacity of the system. After a migration is completed, the scheduler initiates other tasks in the waiting list until all the migrations are completed. With the help of the scheduler, the system can achieve the fast completion of migrations.

Two types of measurements need to be collected for the scheduler to make the migration decision: the memory page dirty rate of each VM, and the available bandwidth of each link in the network. The VM memory dirty rate is obtained by instrumenting the Xen hypervisor to check a bitmap data structure implemented in Xen, which contains the dirty ('1') or not ('0') information for each memory page of the VM. During the data collection, the system reads the dirty bitmap every 50 ms and clean the bitmap every 8 seconds. After performing such 'peak and clean' steps three times, the system computes the average VM memory dirty rate and send it to the migration scheduler.

The network link usages are acquired by monitoring the traffic of each port in network switches through SNMP traffic counters. Based on the traffic values and original capacities of network links, the system can compute the available bandwidth in each link and send it to the migration scheduler. Note in order to ensure the progress of VM migrations, the system sets a low-bound of available bandwidth, e.g., 100 Mbps, for each link. If the computed available bandwidth is below the low-bound, the system uses the low-bound bandwidth to represent the available capacity of that link. By doing so, the migration tasks can always be initiated, although they may compete with the background traffic for bandwidth resources.

The time interval for collecting the VM memory and network link information varies with the dynamics of VM workloads as well as the frequency of multiple concurrent migrations. Usually it can be set in the tens of minutes level to reduce the overhead of data collections. If the workload is relatively steady and concurrent migrations do not occur frequently, the sampling period can even extend to several hours. It is up to system operators to determine the period of collecting the data. For the scheduler, it always uses the last observed measurements to make the migration plan.

If the system contains a large number of machines, the system can have multiple migration schedulers, each of which is responsible for migrations from a subset of VMs. Since current VM migration is only limited in the same local area network (LAN), it is natural to have at least one migration scheduler for each LAN segment in large scale systems.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 6:
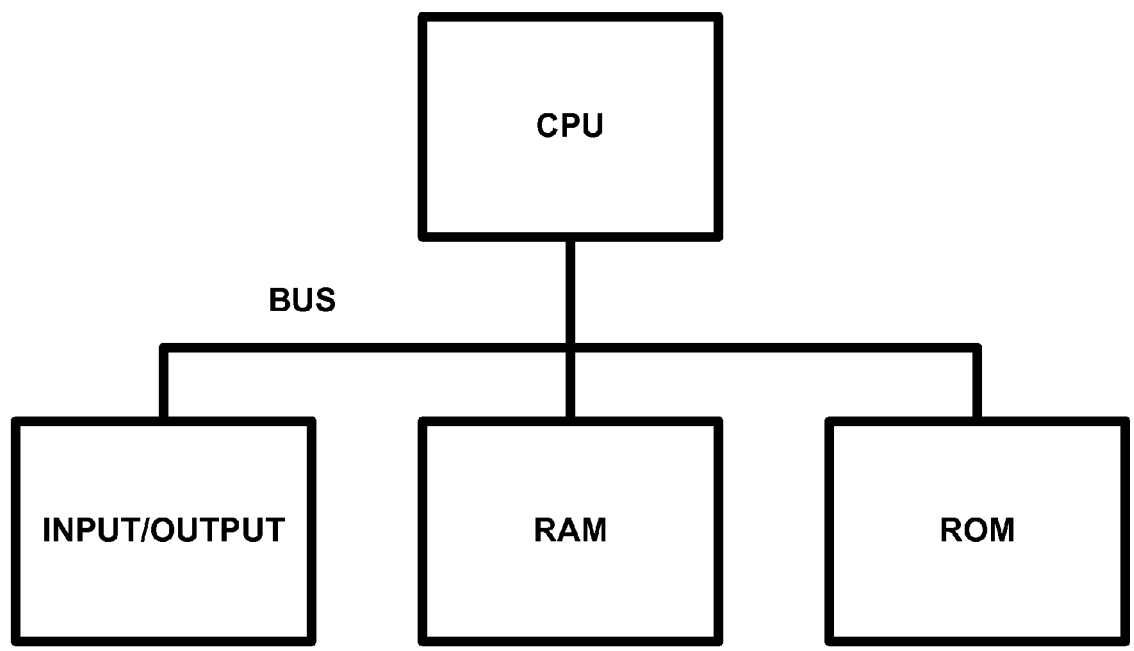
FIG. 6 shows an exemplary computer to perform VM migrations.

By way of example, a block diagram of a computer to support the system is discussed next in FIG. 6. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The system has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to schedule virtual machine (VM) migrations, comprising:
    analyzing VM migration behavior;
    building a simulation tool to predict time for multiple migrations under different links conditions and VM characteristics;
    determining a predetermined bandwidth sharing policy for each network link;
    applying a bin-packing technique to organize bandwidth resources from all network links, and
    allocating the links to different migration tasks.

2. The method of claim 1, comprising analyzing VM migration behavior.

3. The method of claim 1, comprising simulating the performance of a single VM migration.

4. The method of claim 1, comprising simulating the performance of a plurality of VM migrations.

5. The method of claim 4, comprising performing network resource multiplexing.

6. The method of claim 4, comprising determining overhead associated with communication protocols.

7. The method of claim 1, comprising determining global resource assignments.

8. The method of claim 7, comprising determining a network link capacity.

9. The method of claim 7, comprising packing multiple migrations into one.

10. The method of claim 9, comprising performing migration demand estimation.

11. The method of claim 9, comprising packing each item into a bin representing all network links wherein the item denotes each migration task.

12. The method of claim 1, comprising determining available bandwidth in the network links as $$C^{(new)} = C - \sum_{active\ migrations\ M_k} D^{(k)}$$

where C is the original link capacity described in equation (6) and $D^{(k)}$s are the bandwidth demands of ongoing migrations.

13. The method of claim 1, comprising minimizing VM migration time by minimizing a Premigration Overhead, time spent in the 'iterative pre-copy' and 'stop-and-copy' stages, and a Postmigration Overhead.

14. The method of claim 1, comprising determining end-to-end bandwidth demand for migration $M_i$ as a vector $$D^{(i)} = P^{(i)} \times d^{(i)} = [1, 0, 0, \ldots, 1]^T \times d^{(i)}$$

Where a binary vector $P^{(i)} = [1, 0, 0, \ldots, 1]^T$ represents a path of migration $M_i$ with a value '1' in the ith entry indicating an inclusion of the ith link in the path and '0' vice versa and where $d^{(i)}$ is an expected bandwidth allocated to $M_i$.

15. The method of claim 1, comprising determining a local bandwidth demand $d_j^{(i)}$ of $M_i$ in link $1_j^{(i)}$ as $d_j^{(i)} = c_j/s_j^{(i)}$.

16. The method of claim 1, comprising:
    transforming a resource demand vector $D^{(i)}$ for each migration $M_i$ into a scalar $\eta^{(i)}$, $D^{(i)} \rightarrow \eta^{(i)}$, where $\eta^{(i)}$ equals to a summation of all the elements in $D^{(i)}$'
    sorting resource demands based on their transformed $\eta^{(i)}$ values; and
    scanning migration tasks from high to low $\eta^{(i)}$s, wherein for each selected migration task, placing the selected task in an earliest time interval T with free capacities to host the task.

17. The method of claim 1, comprising
    determining bandwidth demand $d_j^{(i)}$ for all links $1_j^{(i)}$, j=1, ..., k along $M_i$'s path; and
    determining an overall bandwidth demand of $M_i$ as a maximum demand among all the local estimations $d^{(i)} = \max\{d_1^{(i)}, d_2^{(i)}, \ldots, d_k^{(i)}\}$.

18. The method of claim 1, comprising means for analyzing VM migration behavior.

19. The method of claim 1, comprising means for simulating the performance of one or more VM migrations.

20. A system to schedule virtual machine (VM) migrations, comprising:
    means for analyzing VM migration behavior;
    means for building a simulation tool to predict time for multiple migrations under different links conditions and VM characteristics;
    means for determining a predetermined bandwidth sharing policy for each network link;
    means for applying a bin-packing technique to organize bandwidth resources from all network links, and
    means for allocating the links to different migration tasks.

* * * * *